United States Patent
Namiki

(10) Patent No.: US 7,231,186 B2
(45) Date of Patent: Jun. 12, 2007

(54) MOBILE STATION EXECUTING ALARM PROCESSING OF A DEGRADED COMMUNICATION QUALITY

(75) Inventor: Hideo Namiki, Tokyo (JP)

(73) Assignee: NEC Corporation, Tokyo (JP)

( * ) Notice: Subject to any disclaimer, the term of this patent is extended or adjusted under 35 U.S.C. 154(b) by 145 days.

(21) Appl. No.: 10/931,571

(22) Filed: Sep. 1, 2004

(65) Prior Publication Data

US 2005/0054374 A1    Mar. 10, 2005

(30) Foreign Application Priority Data

Sep. 10, 2003    (JP) ............... 2003-317618

(51) Int. Cl.
  *H04B 17/00*    (2006.01)
(52) U.S. Cl. ................... 455/67.11; 455/421; 455/423; 455/424; 455/425; 455/436; 455/226.2; 455/226.4; 370/332
(58) Field of Classification Search ............. 455/67.11, 455/421, 226.1–226.4, 436–438, 452.2, 423–425; 370/331, 332, 333
See application file for complete search history.

(56) References Cited

U.S. PATENT DOCUMENTS

| | | | |
|---|---|---|---|
| 5,630,210 A | 5/1997 | Marry et al. | |
| 5,950,139 A | 9/1999 | Korycan | |
| 6,035,183 A | 3/2000 | Todd et al. | |
| 6,243,568 B1* | 6/2001 | Detlef et al. | 455/226.4 |
| 6,363,245 B1* | 3/2002 | Natori | 455/226.3 |
| 2002/0081977 A1* | 6/2002 | McCune, Jr. | 455/67.1 |
| 2002/0127967 A1* | 9/2002 | Najafi | 455/3.05 |
| 2003/0081657 A1 | 5/2003 | Ranta | |
| 2004/0102167 A1* | 5/2004 | Shim et al. | 455/226.2 |
| 2004/0203700 A1* | 10/2004 | Chan et al. | 455/421 |
| 2004/0224690 A1* | 11/2004 | Choi et al. | 455/436 |

FOREIGN PATENT DOCUMENTS

| | | | |
|---|---|---|---|
| CN | 1249644 A | | 4/2000 |
| GB | 2 343 334 A | | 5/2000 |
| GB | 2343334 | * | 5/2000 |
| JP | A-6-61938 | | 3/1994 |
| JP | A-9-233018 | | 9/1997 |
| JP | A-2002-374575 | | 12/2002 |

OTHER PUBLICATIONS

European Office Action dated May 2, 2005.

* cited by examiner

*Primary Examiner*—Steve M. D'Agosta
(74) *Attorney, Agent, or Firm*—Scully, Scott, Murphy & Presser, P.C.

(57) ABSTRACT

A mobile station includes a degradation detecting section for detecting a degraded communication quality, an electric field measurement section for measuring an intensity of an electric field, and a display unit for representing a field level among a plurality of field levels. The display unit represents, upon generation of the degraded communication quality, a fixed field level instead of the field level corresponding to the intensity of the electric field measured by the electric field measurement section.

17 Claims, 12 Drawing Sheets

MOBILE STATION EXECUTING ALARM PROCESSING OF A DEGRADED COMMUNICATION QUALITY

BACKGROUND OF THE INVENTION (a) Field of the Invention

The present invention relates to a mobile station executing an alarm processing of a degraded communication quality. The present invention also relates to a method for representing an electric field level on a display unit of the mobile station.

(b) Description of the Related Art

A user of a mobile station generally knows the intensity (or level) of the electric field of a radio signal received in the mobile station by observing an image of antenna bars represented on the display unit of the mobile station. If the electric field level represented on the display unit is lower, the user accepts the state of disconnection of the link to the mobile station as an unavoidable fact. If the electric field level is higher, to the contrary, and yet the link to the mobile station is in the state of disconnection, the user will consider this fact as an abnormal state.

Similarly, the user accepts a disconnection or an alarm of disconnection of the link as well as degradation in the communication quality thereof during performing the communication, if the electric field level represented on the display unit is lower. However, the user cannot accept such a disconnection or an alarm of disconnection during performing the communication if the electric field level represented on the display unit is higher, feeling uncomfortable or receiving a strong stress upon generation of the disconnection or alarm of disconnection.

As used in some mobile stations, there is a technique for measuring the signal level of the common channel transmitted from the base station by measuring an RSSI (received signal strength indicator) or RSCP (received signal code power), to represent the intensity of the electric field on the display unit, while using the measured RSSI or RSCP as a reference. This technique is described in Patent Publication JP-A-2002-374575, for example.

In the mobile network system notifying the user of the state of radio signal (or electromagnetic wave) by using the technique as described above, the user can recognize the state of radio signal and may accept the possibility of disconnection by observing the indication on the display unit.

There is another technique used in the mobile network system for detecting a degraded communication quality by using a bit error rate in the received signal during the communication, notifying the user of the degraded communication quality by using a sound alarm, for example. This technique is described in Patent Publications JP-A-9(1997)-233018 and -6(1994)-61938, for example.

FIG. 10 shows a flowchart of the another technique for detecting a degraded communication quality. It is first judged whether or not the mobile station is in the state of communication (step S51). If the judgement in step S51 is, negative, the process advances to step S55 to set the flag of the degraded communication quality at an OFF (set the flag Q_ALM=OFF), for executing an alarm stop processing. It is to be noted that the alarm stop processing is such that an alarm for a degraded communication quality is not generated or an existing alarm is stopped. The alarm may be a sound alarm, or a light alarm emitted from an LED (light emitting diode), notifying the use of the degraded communication quality during the communication.

On the other hand, if the judgement in step S51 is affirmative, CRC (cyclic redundancy check) tests are performed on the received data to count the number of errors (NGs) per unit time period in the received data. The length of the unit time period is arbitrarily determined. This CRC-NG test is completed for every unit time period, and the number of NGs of the unit periods are accumulated and stored as a variable CRC (step S52).

The variable CRC is then compared against a threshold $CRC_{th}$ (step S53). If $CRC<CRC_{th}$ is judged in step S53, then the process advances to step S55 wherein the alarm is not generated or stopped, whereby the flag Q_ALM=OFF. If $CRC \geq CRC_{th}$ is judged in step S53, then the alarm for a degraded communication quality is generated, or continued if it has been generated in the earlier cycle, whereby the flag Q_ALM=ON.

FIG. 11 shows a flowchart of the technique for representing the electric field level on the display unit. First, the mobile station detects the electric field level $L_{evel}$ (step S61). The detection is performed periodically, or may be performed continuously. The detected electric field level, which may be detected by measuring an RSSI or RSCP, is stored as a variable $L_{evel}$.

It is judged in step S62 whether or not the variable $L_{evel}$ is lower than a first threshold $L_{th1}$. If the judgement in step S62 is affirmative, the process advances to step S63, wherein the variable, or detected electric field level, $L_{evel}$ is represented as level-1 on the display unit, the level-1 meaning the lowest electric field level. If the electric field level is to be visually represented on the display unit, the level-1 may be represented by a single antenna, whereas level-2 and level-3 may be represented by two antennas and three antennas, respectively, for example, thereby showing the intensity level of the electric field.

If the judgement in step S62 is negative, the process advances to step S64, wherein it is further judged whether or not the variable $L_{evel}$ is lower than a second threshold $L_{th2}$ which is higher than the first threshold $L_{th1}$. If the judgement in step 64 is affirmative, then the process advances to step S65, wherein the electric field level is represented as level-2, i.e., by two antennas. If the judgement in step S64 is negative, the process advances to step S66 wherein the electric field level is represented as level-3, i.e., by three antennas.

FIG. 12 shows the relationship between the intensity of the electric field and the number of NGs counted in the CRC tests in the conventional mobile station. FIG. 12 also shows the level number represented on the display unit for the intensity of the electric field, at the top of the figure.

In FIG. 12, it is shown that the number of NGs is compared against a threshold $CRC_{th}$ to generate an alarm in the time interval between T1 and T2 and in the time interval between T3 and T4.

The alarm generated in the time interval between T1 and T2 may be accepted by the user, because the electric field level represented on the display unit is level-1. On the other hand, the alarm generated in the time interval between T3 and T4 cannot be necessarily accepted, because the electric field level represented on the display unit is level-3. This alarm provides a sense of discomfort to the user due to the fact that the degraded communication quality occurs under a strong electric field, or a favorable electric field level.

In general, the level of electric field is detected for the common channel of the area where the mobile station is located, whereas the degraded communication quality is detected based on the CRC tests for the specific channel through which the mobile station communicates with the base station. More specifically, the electric field level or state of the electric field may have a discrepancy between the common channel and the specific channel in some cases. This is the reason that the user feels the sense of discomfort in the alarm informing the degraded communication quality.

SUMMARY OF THE INVENTION

In view of the above problem in the conventional mobile station, the present invention provides a mobile station which is capable of representing the electric field level and detecting a degraded communication quality without impairing the functions of the mobile station and without providing a sense of discomfort to the user.

It is another object of the present invention to provide a method for representing an electric field level in the mobile station and a program defining the operation of the mobile station according to the present invention.

The present invention provides a mobile station including: a degradation detecting section for detecting a degraded communication quality of the mobile station to generate a degraded quality signal; an electric field measurement section for measuring an intensity of an electric field of the mobile station; a display section for representing a field level corresponding to the measured intensity of the electric field among a plurality of field levels; and a control section for responding to the degraded quality signal, to allow the display section to represent a fixed field level instead of the field level corresponding to the detected intensity of the electric field.

The present invention also provides a method including the steps of: detecting a degraded communication quality of the mobile station to generate a degraded quality signal; measuring an intensity of an electric field of the mobile station; and representing a first field level among a plurality of field levels, the first field level corresponding to the measured intensity of the electric field upon no generation of the degraded quality signal, the first field level being a fixed level upon generation of the degraded quality signal.

The present invention also provides a program stored in a recording medium for running on a computer of a mobile station to define the steps of: detecting a degraded electric field of the mobile station to generate a degraded quality signal; measuring an intensity of an electric field of the mobile station; and representing a first field level among a plurality of field levels, the first field level corresponding to the measured intensity of the electric field upon no generation of the degraded quality signal, the first field level being a fixed level upon generation of the degraded quality signal.

In accordance with the mobile station, method and program of the present invention, since a higher electric field level is not represented on the display section upon generation of the degraded communication quality, the user does not feel sense of discomfort caused by the discrepancy between the represented electric field level and the degraded communication quality.

The above and other objects, features and advantages of the present invention will be more apparent from the following description, referring to the accompanying drawings.

PREFERRED EMBODIMENT OF THE INVENTION

Now, the present invention is more specifically described with reference to accompanying drawings.

Figure 1:
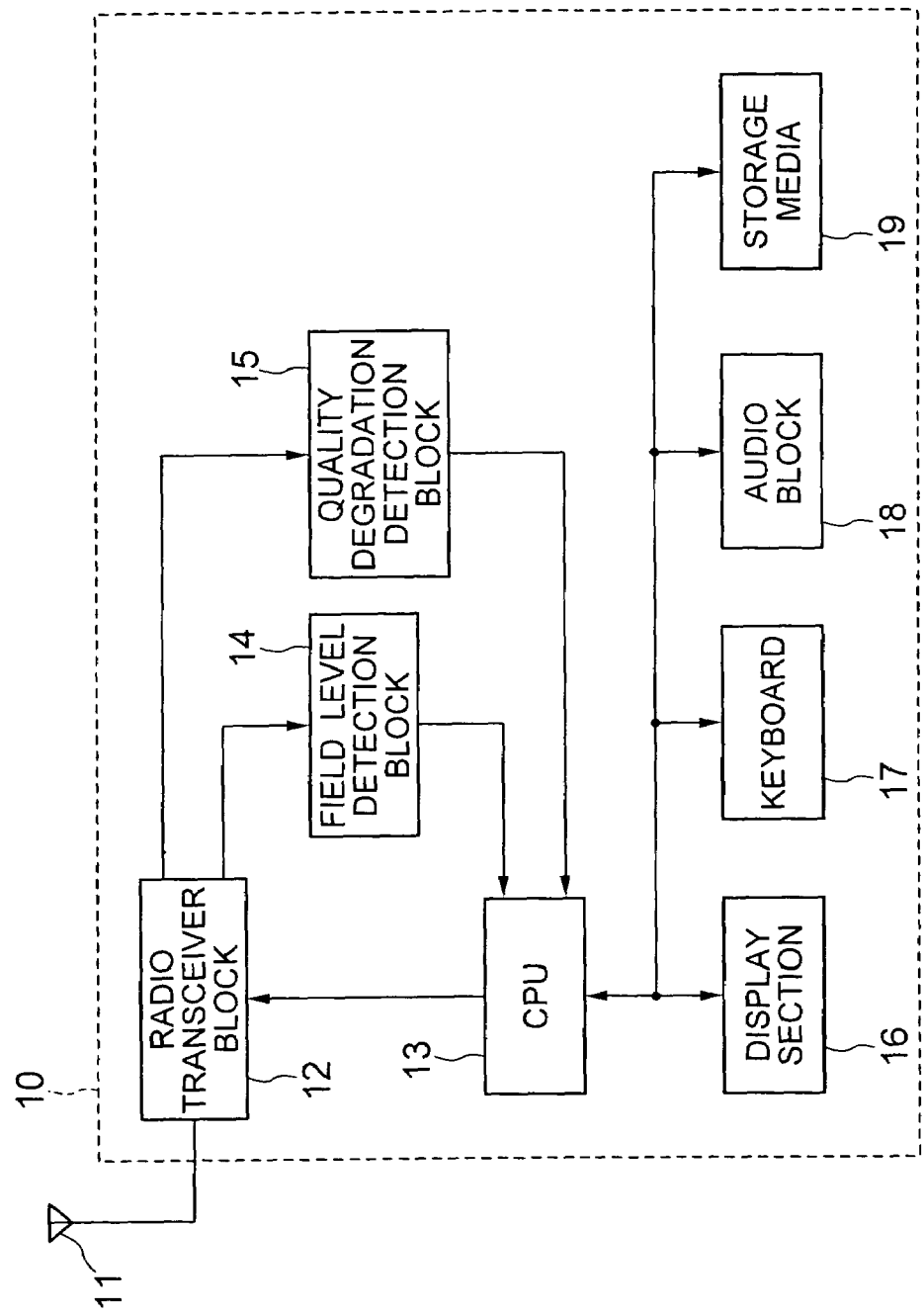
FIG. 1 is a block diagram of a mobile station according to an embodiment of the present invention.

Referring to FIG. 1, a mobile station, generally designated by numeral 10, according to an embodiment of the present invention includes antenna 11, radio transceiver block 12, CPU 13, field level detection block 14, quality degradation detection block 15, display unit 16, keyboard 17, voice input/output (audio) block 18, and a storage media 19.

The antenna 11 and radio transceiver block 12 operate for transmission/reception of radio signals. The field level detection block 14 detects the level of the electric field based on the received data supplied from the radio transceiver block 12. More specifically, the field level detection block 14 measures an RSS1, RSCP etc. in the received data. The quality degradation detection block 15 operates for CRC tests based on the received data.

The CPU 13 executes the program stored in the storage media 19, thereby controlling the overall operation of the mobile station 10. The storage media 19 includes a ROM for storing therein the program, and a RAM for storing data supplied from the CPU 13 or other blocks.

The CPU 13, after starting for a detection processing of the degraded communication quality, executes an alarm stop processing for the degraded communication quality, if the mobile station is out of the state of communication, because the default of the flag Q_ALM is OFF (Q_ALM=OFF). The alarm for the degraded communication quality may be a sound alarm, a light alarm emitted from an LED and/or an alarm representation on the display unit 16.

If the CPU 13 judges that the mobile station is in the state of communication, further judges whether or not the communication quality is degraded based on the results of detection in the CRC-NG tests by the quality degradation detection block 15. The CRC-NG test is performed every specified time period. In this judgement, the numbers of NGs are accumulated for a plurality of specified time periods and stored as a variable CRC. The specified time period and the number of the specified time periods for accumulation may be determined as desired.

The CPU 13 compares the variable CRC against a threshold $CRC_{th}$, and if the variable CRC is below the threshold $CRC_{th}$, the CPU executes an alarm stop processing after setting the flag Q_ALM=OFF. The alarm stop processing is such that an alarm is not generated, or an existing alarm, if any, is stopped.

If the variable CRC is equal to or exceeds the threshold $CRC_{th}$, then the CPU 13 sets the flag Q_ALM=ON to execute an alarm processing. That is, the CPU 13 generates an alarm if it is not yet generated, and continues the alarm if it has been already generated.

For representing the electric field level, the CPU 13 periodically detects the electric field level by using the field level detection block 14. The interval of the measurements may be selected as desired. In general, an RSSI or RSCP is measured for this purpose and the detected level of the electric field is stored as a variable $L_{evel}$.

The CPU 13 then judges the flag Q_ALM determined by the quality degradation detection step. If it is judged that the flag Q_ALM=ON, i.e., the quality degradation alarm is already generated, the CPU 13 operates for representing the level-1 for the electric field level. It is to be noted that level-1 is a minimum level corresponding to a single antenna representation whereas level-3 is a maximum level corresponding to a three-antenna representation, with level-2 being an intermediate level.

If the CPU judges the flag Q_ALM=OFF, then the CPU 13 compares the variable $L_{evel}$ against the first threshold $L_{th1}$ for the electric field level. If the variable $L_{evel}$ is below the first threshold $L_{th1}$, the CPU 13 operate for representing the level-1 for the electric field level.

If it is judged that the variable $L_{evel}$ is equal to or exceeds the first threshold $L_{th1}$, then the CPU 13 compares the variable $L_{evel}$ against the second threshold $L_{th2}$. If the variable $L_{evel}$ is equal to or exceeds the second threshold $L_{th2}$, the CPU 13 operates for representing the level-3 for the electric field level, whereas if the variable $L_{evel}$ is below the second threshold $L_{th2}$, the CPU 13 operates for representing the level-2 for the electric field level.

The above procedure removes the sense of discomfort such as felt by the user in the conventional technique, without degrading the functions of the alarm of degraded communication quality and representing the electric field level.

Figure 2:
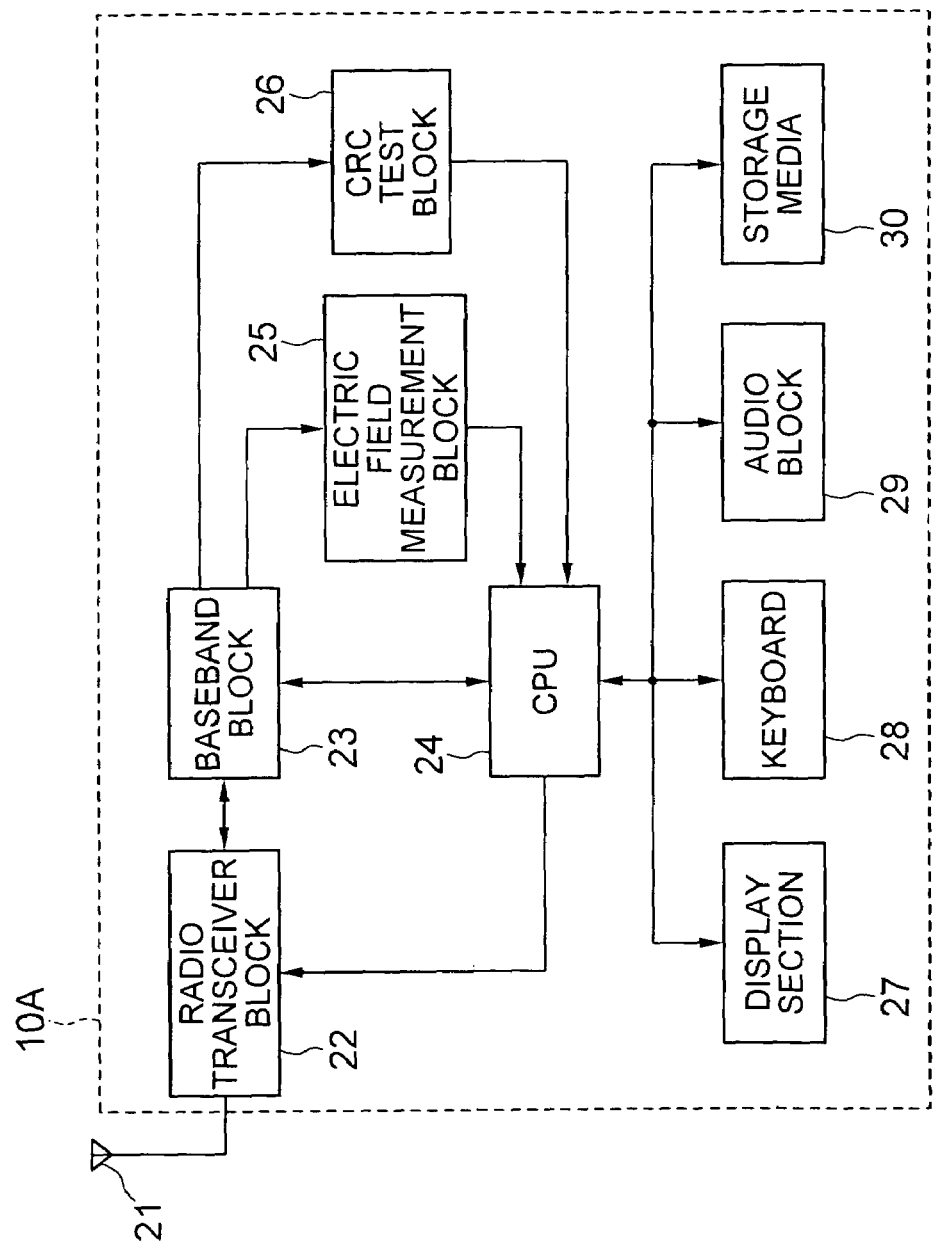
FIG. 2 is a block diagram of a mobile station according to a first example of the present invention.

Referring to FIG. 2, a mobile station, generally designated by symbol 10A, according to a first example of the present invention includes antenna 21, radio transceiver block 22, baseband block 23, CPU 24, electric field measurement block 25, CRC test block 26, display unit 27, keyboard 28, voice input/output (audio) block 29, and a storage media 30. The electric field measurement block 25 and CPU 24 correspond to the field level detection block in FIG. 1, whereas the CRC test block 26 and the CPU 24 correspond to a quality degradation detection block 15 shown in FIG. 1.

The antenna 21 and radio transceiver block 22 transmit/receive radio signals, whereas the baseband block 23 operates for processing of the data received/transmitted by the radio transceiver block 22. The electric field measurement block 25 measures an RSSI or RSCP based on the received data. The CRC test block 26 detects the number of errors (NGs) per unit period in the received data by using a CRC technique.

The CPU 24 executes the program stored in the storage media 30, thereby controlling the overall operation of the mobile station 10A. The storage media 30 includes ROM for storing therein the program, and a RAM for storing therein data to be processed by the CPU 24. Other constituent elements 27 to 29 are similar to those 16 to 18 in the embodiment.

The CPU 24, after starting for. a degradation detection processing of the communication quality, operates for an alarm stop processing after setting the flag Q_ALM=OFF, if the mobile station 10A is out of the state of communication.

If it is judged that the mobile station 10A is in the state of communication, the CPU 24 judges the degree of errors in the received data based on the number of NGs detected by the CRC test block 26. In this step, the numbers of NGs generated in the unit time intervals are accumulated and stored as a variable CRC.

The CPU 24 then compares the variable CRC against the threshold $CRC_{th}$, and if the variable CRC is below the threshold $CRC_{th}$, the CPU 24 executes an alarm stop processing of the degraded communication quality, after setting the flag Q_ALM=OFF.

If the variable CRC is equal to or exceeds the threshold $CRC_{th}$, the CPU 24 starts for processing to represent the degraded communication quality, after setting the flag Q_ALM=ON. This processing is such that a new alarm is generated or an existing alarm is continued.

In the mean time, after the CPU 24 starts for processing of representing the electric field level, the CPU 24 allows the electric field measurement block 25 to periodically measure the electric field level. The interval of the measurement may be selected as desired, or the measurement may be continuous instead. An RSSI or RSCP is measured in the measurement of the electric field level, and stored as a variable $L_{evel}$.

The CPU 24 then judges the flag Q_ALM set in the degradation detection processing of the communication quality. If it is judged Q_ALM=ON, i.e., if an alarm is being generated, the CPU 24 executes processing of representing the level-1 for the electric field level. It is to be noted that level-1 corresponds to a minimum electric level.

If the CPU 24 judges the flag Q_ALM=OFF, then the CPU 24 compares the variable $L_{evel}$ against the first threshold $L_{th1}$. If it is judged that the variable $L_{evel}$ is below the first threshold $L_{th1}$, the CPU 24 represents the level-1 on the display unit 27 for the electric field level.

If it is judged that the variable $L_{evel}$ is equal to or above the first threshold $L_{th1}$, the CPU 24 further compares the variable $L_{evel}$ against the second threshold $L_{th2}$. If it is judged that the variable $L_{evel}$ is equal to or above the second threshold $L_{th2}$, the CPU represents the level-3 for the electric field level on the display unit 27. If the variable $L_{evel}$ is below the second threshold $L_{th2}$, the CPU 24 represents the level-2 for the electric field level.

In the above example, the user does not feel the sense of discomfort because there is no mismatching between the alarm of degraded communication quality and the level of the detected electric field, without degrading the functions of the field level measurement block 25 and the CRC test block 26.

Figure 3:
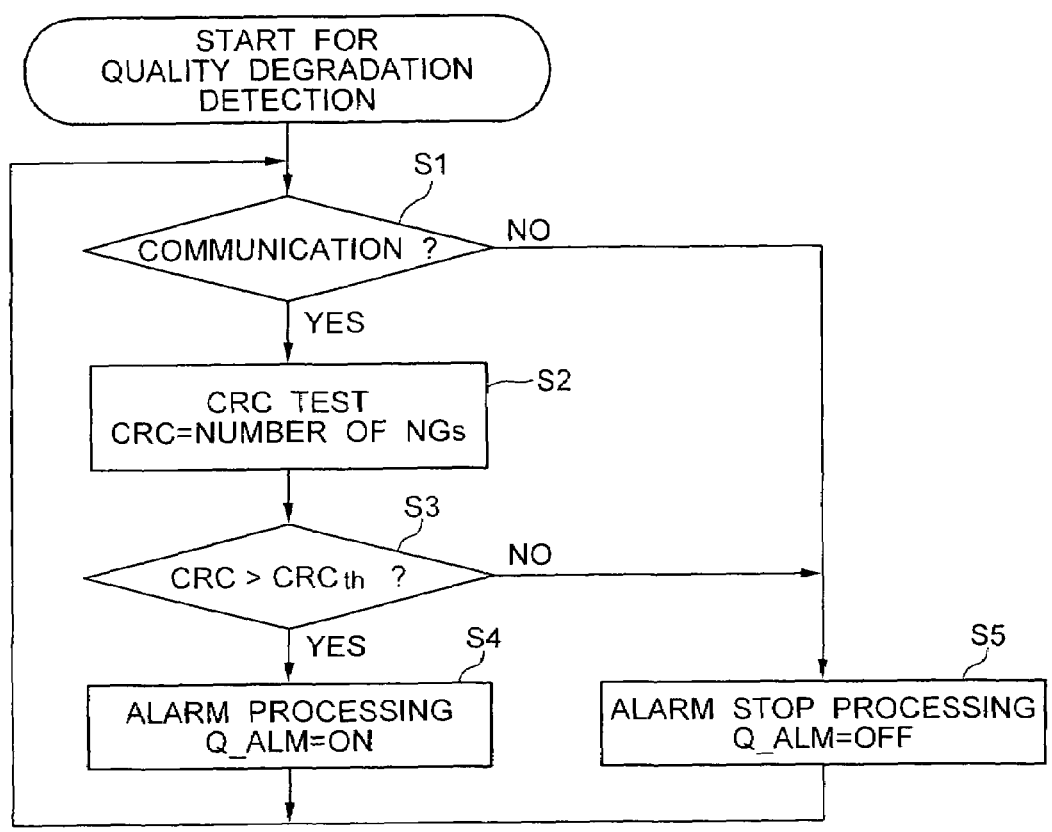
FIG. 3 is a flowchart for a detection processing of degraded communication quality by the mobile station of FIG. 2.

FIG. 3 shows a flowchart of the degradation detection processing for the communication quality in the mobile station 10A in the first example.

When starting for the degradation detection processing of the communication quality, the CPU 24 judges whether or not the mobile station 10A is in the state of communication (step S1). If the judgement is negative, the CPU 24 executes an alarm stop processing (step S5), after setting the flag Q_ALM=OFF.

If the judgement in step S1 is affirmative, the CRC test block 26 detects the number of NGs counted in the CRC tests in the received data (step S2). More specifically, the number of NGs in the unit time intervals are accumulated and stored as the variable CRC.

The CPU 24 compares the variable CRC against the threshold $CRC_{th}$ (step S3). If $CRC<CRC_{th}$ in step S3, the CPU 24 executes an alarm stop processing for the degraded communication quality, after setting the flag Q_ALM=OFF. If $CRC \geq CRC_{th}$ in step S4, the CPU 24 executes an alarm processing of the degraded communication quality, after setting the flag Q_ALM=ON.

Figure 4:
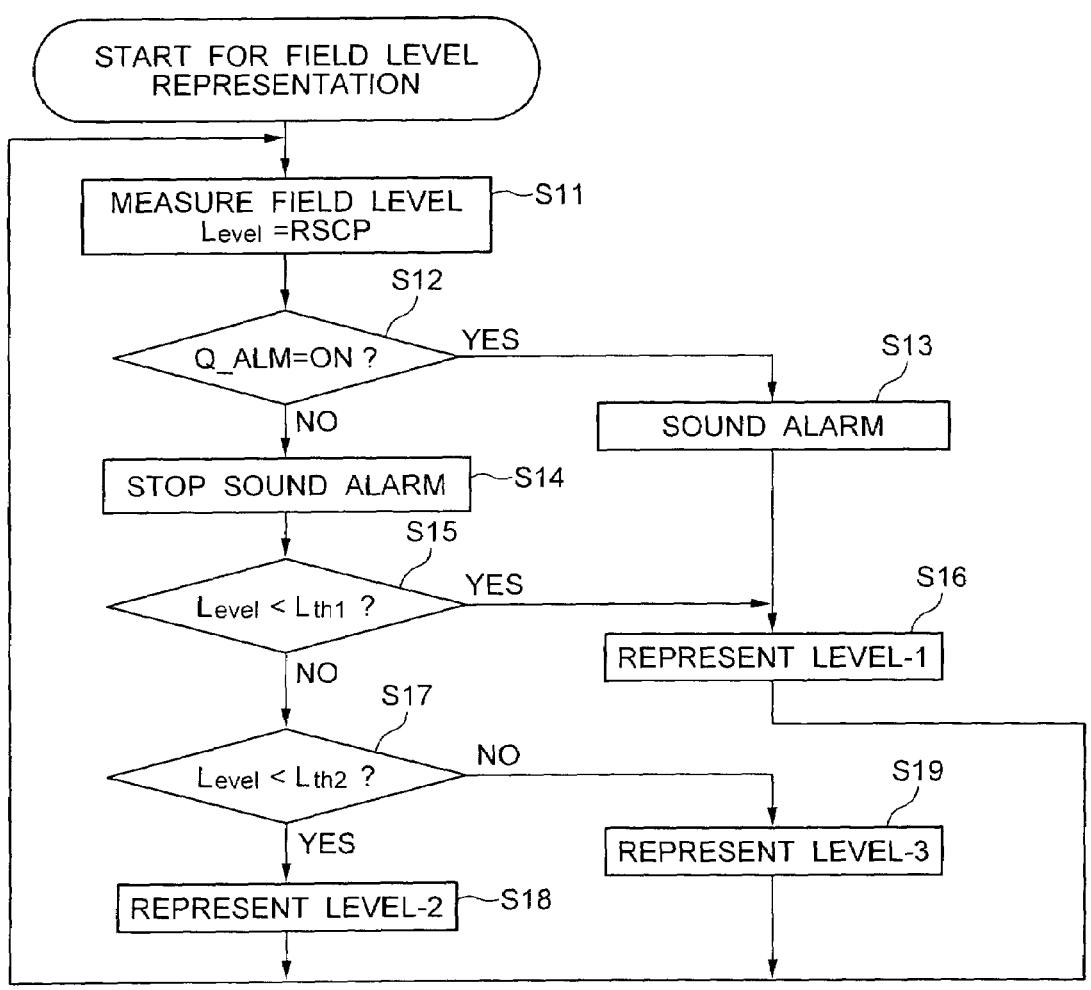
FIG. 4 is a flowchart for representation of the electric field level by the mobile station of FIG. 2.

FIG. 4 shows a flowchart of the level representation processing of the electric field thereof. When starting for a level representation processing, the electric field measurement block 25 periodically measures the level of the electric field (step S11). In this step, an RSCP is measured and stored as the variable $L_{evel}$.

The CPU 24 judges the flag Q_ALM (step S12). If the flag Q_ALM=ON thereby indicating an alarm processing of the degraded communication quality, the CPU 24 generates a sound alarm (step S13) and represents the level-1 for the electric field on the display unit 27 (step S16).

If the flag Q_ALM=OFF thereby indicating an alarm stop processing of the degraded communication quality, the CPU 24 executes a sound alarm stop processing (step S14), and compares the variable $L_{evel}$, against the first threshold $L_{th1}$ (step S15). If $L_{evel}<L_{th1}$ in step S15, the CPU 24 represents the level-1 for the electric field on the display unit 27 (step S16). If $L_{evel} \geq L_{th1}$ in step S15, then the CPU 24 further compares the variable $L_{evel}$ against the second threshold $L_{th2}$ (step S17). If $L_{evel}<L_{th2}$ in step S17, the CPU 24 represents the level-2 for the electric field on the display unit 27 (step S18). If $L_{evel} \geq L_{th2}$ in step S17, then the CPU 24 represents the level-3 for the electric field (step S19).

Figure 5:
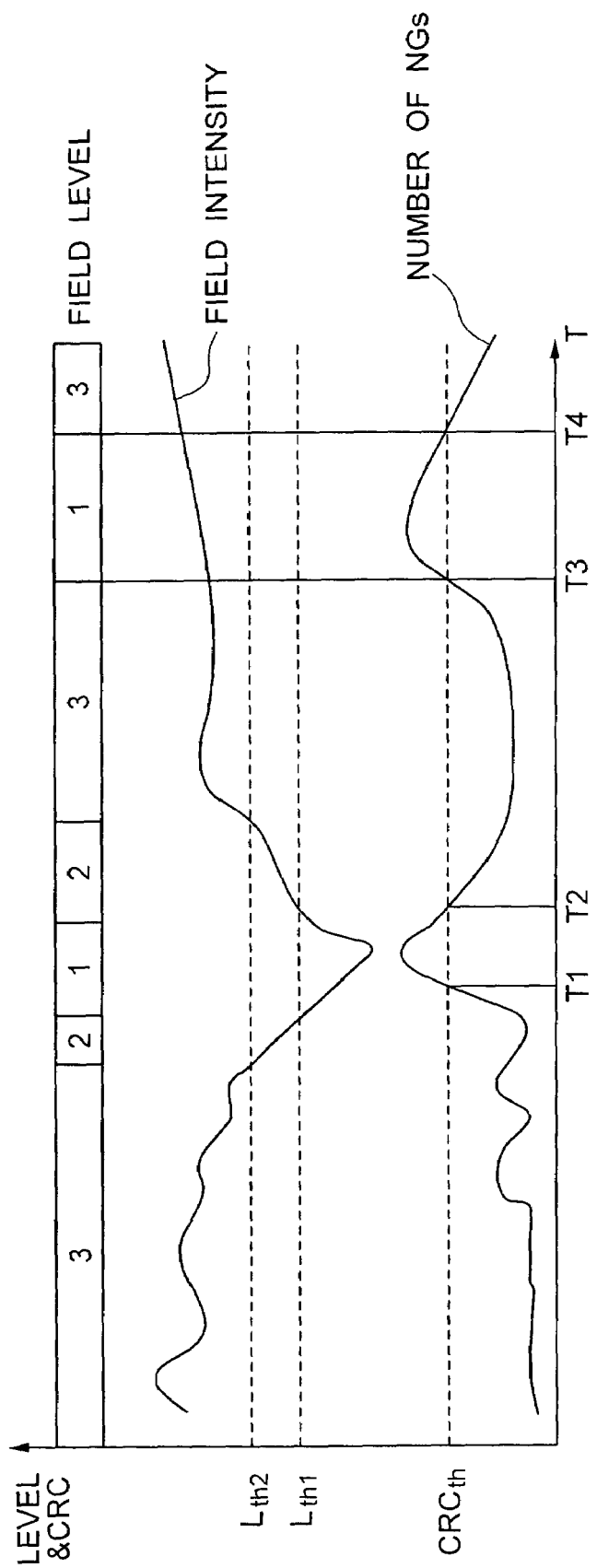
FIG. 5 is a graph showing the relationship between the intensity of electric field and the number of NGs counted in the CRC tests of the mobile station of FIG. 2.
Figure 12:
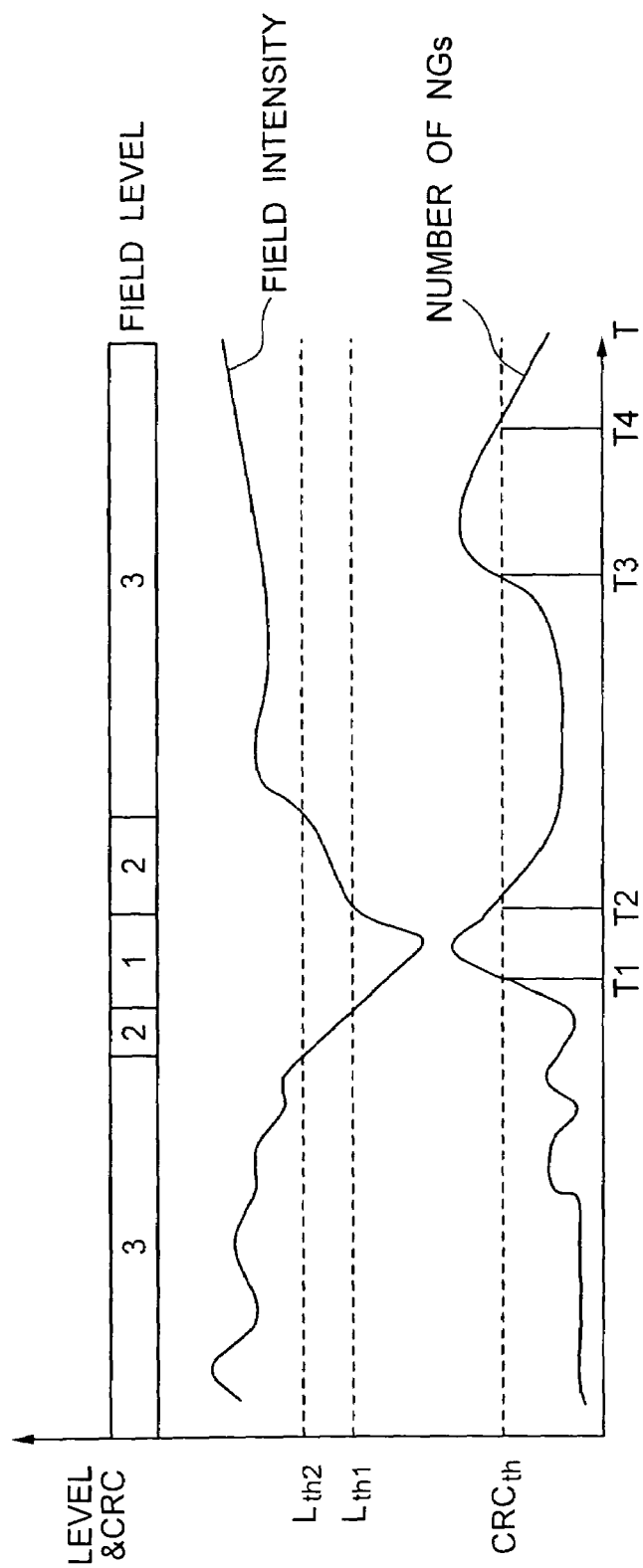
FIG. 12 is a graph showing the relationship between the electric field level and the number of NGs counted in the CRC tests.

FIG. 5 shows the relationship between the electric field level and the number of NGs in the CRC tests in the present example, similarly to FIG. 12 showing the relationship in the conventional mobile station.

In the present example, it is to be noted that the representation of the electric field level is controlled based on the variable $L_{evel}$ being compared against the first and second thresholds $L_{th1}$ and $L_{th2}$ as well as on the number of NGs counted in the CRC tests being compared against the threshold $CRC_{th}$.

As understood from FIG. 5, an alarm of the degraded communication quality is generated in the time intervals between T1 and T2 and between T3 and T4, wherein the electric field level in these time intervals is represented by the level-1, differently from the level-3 represented in the time interval between T3 and T4 in the conventional mobile station. This conforms to the general sense of the user that a lower electric field level may correspond to a degraded communication quality.

Figure 6:
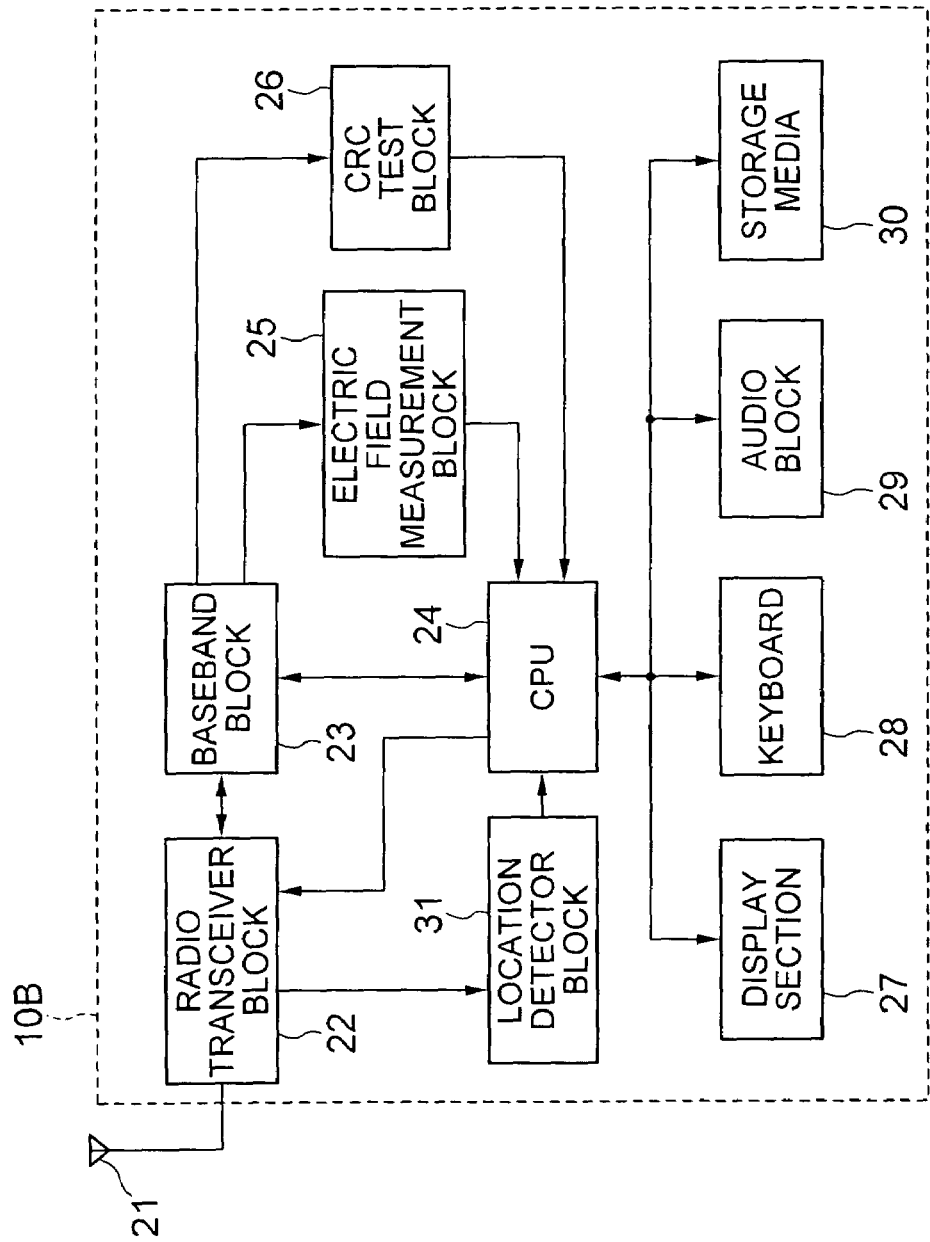
FIG. 6 is a block diagram of a mobile station according to a second example of the present invention.

Referring to FIG. 6, a mobile station, generally designated by symbol 10B, according to a second example of the present invention is similar to the mobile station 10A of the first example except that a location detector block 31 is additionally provided in the mobile station 10B of the present example.

The location detector block 31 analyzes the radio signals transmitted from the base stations (not shown), to detect the location of the own mobile station 10B while judging the distances from the several base stations based on the received radio signals. The CPU 24 judges whether or not the user of the mobile station 10B moved from the last location detected by the location detector block 31. The mobile station 10B may use a GPS as the location detector block 31 if the GPS is provided in the mobile station 10B. In this case, a more precise location can be measured.

If the CPU 24 judges that the user of the mobile station 10B is moving, the CPU 24 executes a degradation detection processing of the communication quality and detection of the electric field level independently of each other at specified intervals, such as every second.

On the other hand, if the CPU 24 judges that the user of the mobile station 10B is not moving, the CPU 24 allows the electric field measurement block 25 to measure the electric field level at every second similarly to the above case and allows the CRC test block 26 to execute the CRC tests less frequently at an interval of, for example, 10 seconds. This reduces the power dissipation of the mobile station 10B.

Figure 7:
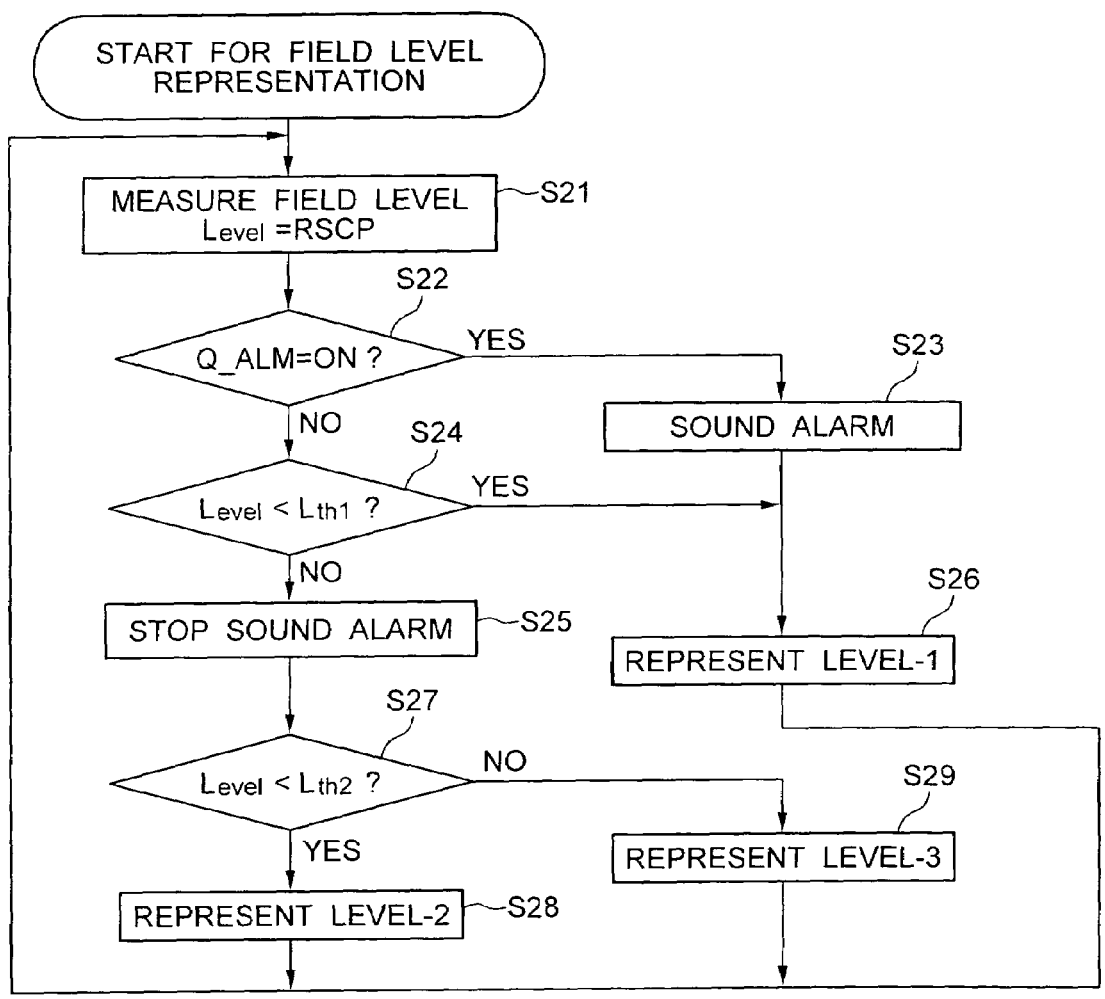
FIG. 7 is a flowchart for representation of the electric field level by a mobile station according to a third example of the present invention.

FIG. 7 shows the procedure of the field level measurement by the electric field measurement block 25 in the mobile station 10B of the present example.

After starting the field level measurement processing, the electric field measurement block 25 periodically measures the electric field level (step S21). In this embodiment, an RSCP is measured and stored as a variable $L_{evel}$.

The CPU 24 then judges the flag Q_ALM set based on the result of the degradation detection of the communication quality (step S22). If the flag Q_ALM=ON, the mobile station 10B generates a sound alarm (step S23), followed by representation of the level-1 for the electric field level on the display unit 27 (step S26).

If the flag Q_ALM=OFF, then the CPU 24 compares the variable $L_{evel}$ against the first threshold $L_{th1}$ (step S24). If $L_{evel}<L_{th1}$ in step S24, then the CPU 24 represents the level-1 for the electric field level on the display unit 27 (step S26).

If $L_{evel} \geq L_{th1}$ in step S24, then the CPU 24 executes an alarm stop processing of the degraded communication quality (step S25). The CPU 24 then compares the variable $L_{evel}$ against the second threshold $V_{th2}$ (step S27). If $L_{evel}<L_{th2}$, then the CPU 24 represents the level-2 for the electric field level on the display unit 27 (step S28). If $L_{evel} \geq L_{th2}$, then the CPU 24 represents the level-3 for the electric field level (step S29).

In the present example, since the alarm of the degraded communication quality is generated only in the case of the level-1 being represented on the display unit 27 for the electric field level, the user accepts the alarm as a matter of course.

Figure 8:
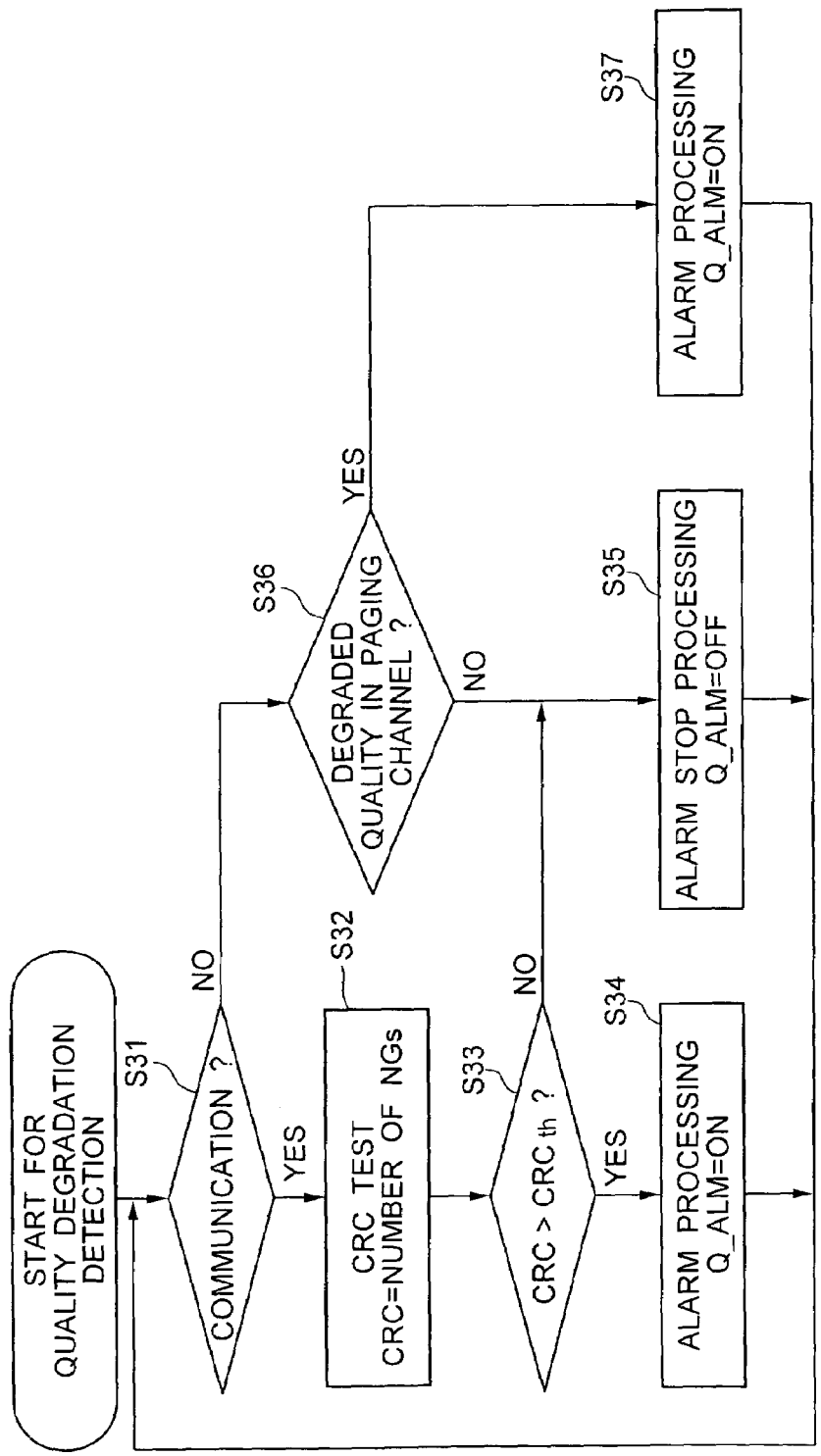
FIG. 8 is a flowchart for detection processing of the degraded communication quality by a mobile station according to a fourth example of the present invention.

FIG. 8 shows a flowchart of a mobile station according to a fourth example of the present invention, the configuration of which is similar to that shown in FIG. 2.

After starting for the degradation detection processing of the communication quality, it is judged whether or not the mobile station is in the state of communication (step S31). If the judgement in step S31 is negative, then the CPU 24 judges whether or not the paging channel of the mobile station has a degraded communication quality (step S36). If degradation is judged in step S36, the CPU 24 sets the flag Q_ALM=ON for executing an alarm processing of the communication quality and notifying the user of the degraded communication quality (step S37).

If no degradation is judged in step S36, the CPU 24 executes an alarm stop processing, after setting the flag Q_ALM=OFF (step S35).

On the other hand, if it is judged in step S31 that the mobile station is in the state of communication, the CPU 24 allows the CRC test block 26 to count the number of NGs in the CRC test (step S32). In this step, the numbers of NGs counted in the CRC tests are accumulated and stored as a variable CRC.

The CPU 24 then judges whether or not CRC>CRC$_{th}$ (step S33). If the judgement in step S33 is negative, the CPU 24 sets the flag Q_ALM=OFF (step S35) to execute an alarm stop processing for the communication quality.

If CRC>CRC$_{th}$ is judged in step S33, then the process advances to step S34, wherein the CPU 24 sets the flag Q_ALM=ON to execute an alarm processing.

Figure 9:
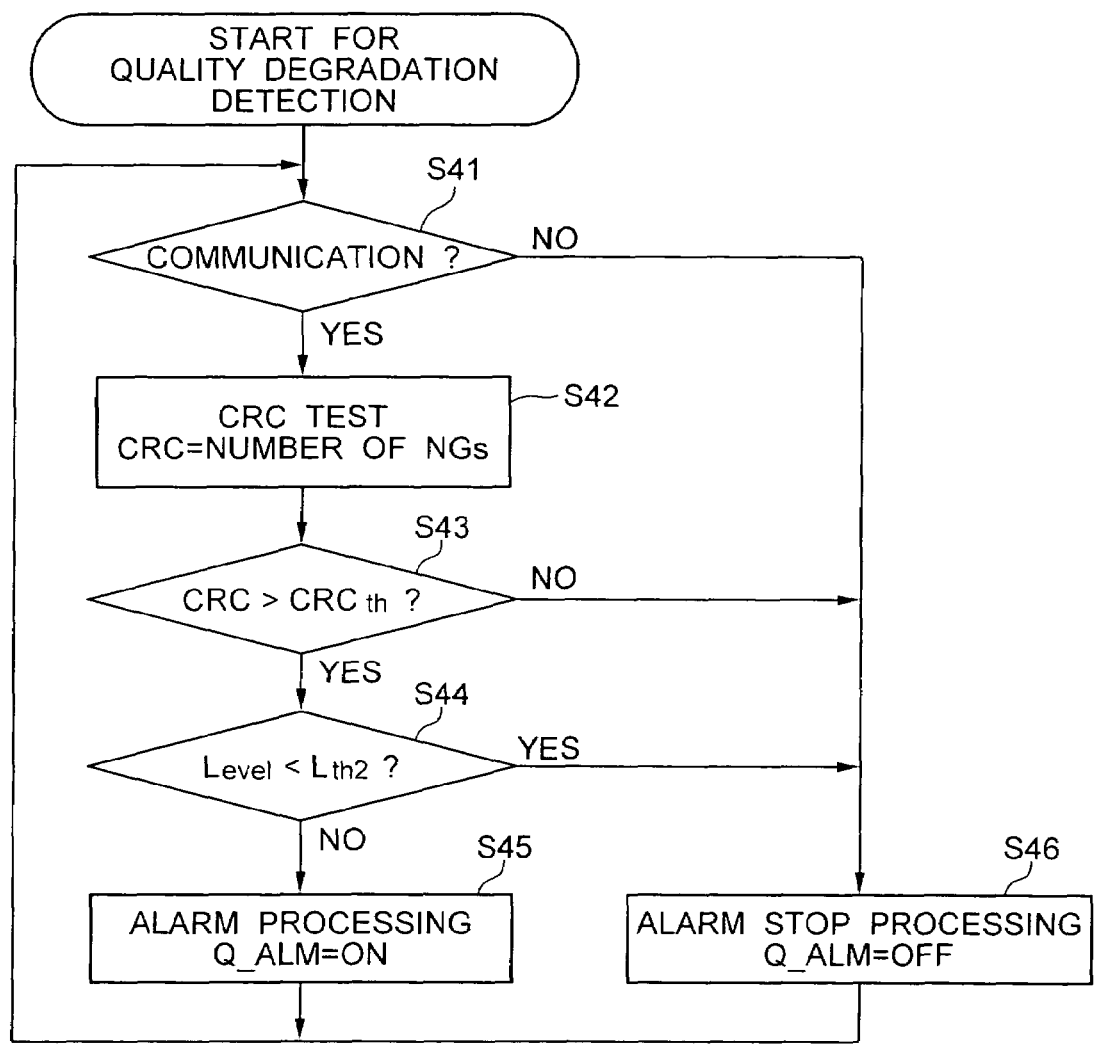
FIG. 9 is a flowchart for detection processing of the degraded communication quality by a mobile station according to a fifth example of the present invention.
Figure 10:
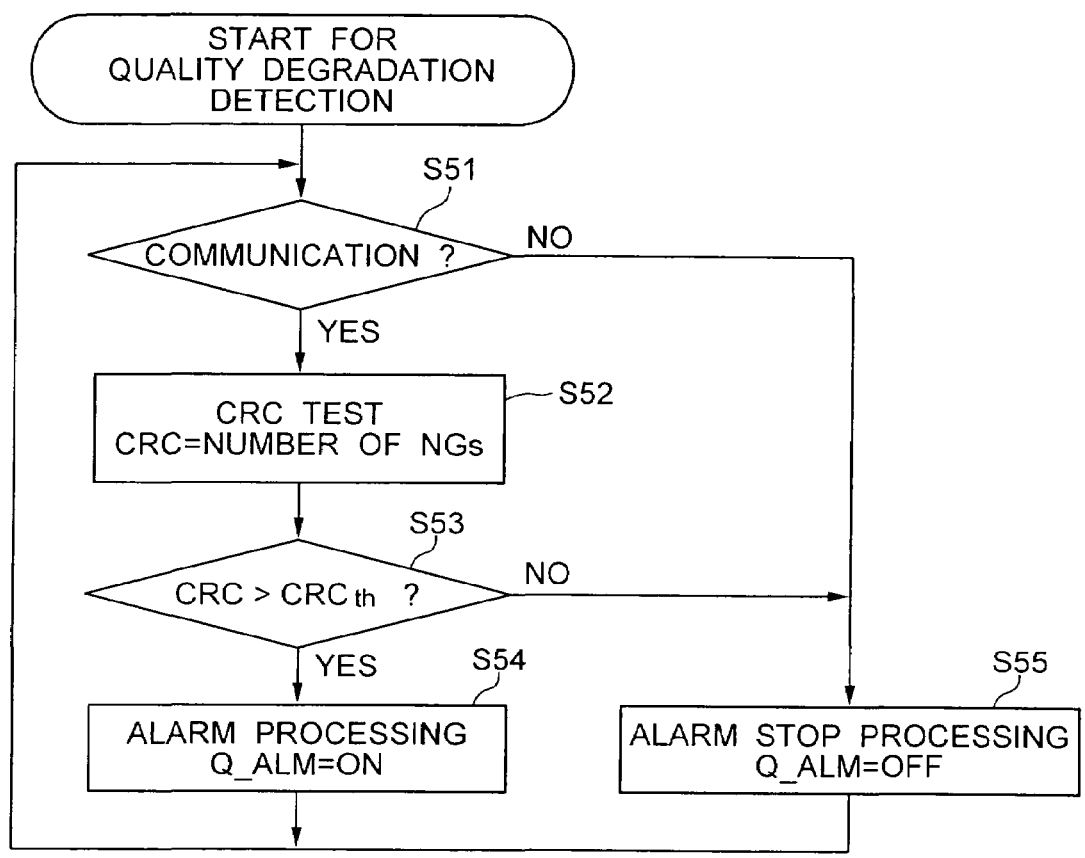
FIG. 10 is a flowchart of for detection processing of the degraded communication quality by a conventional mobile station.
Figure 11:
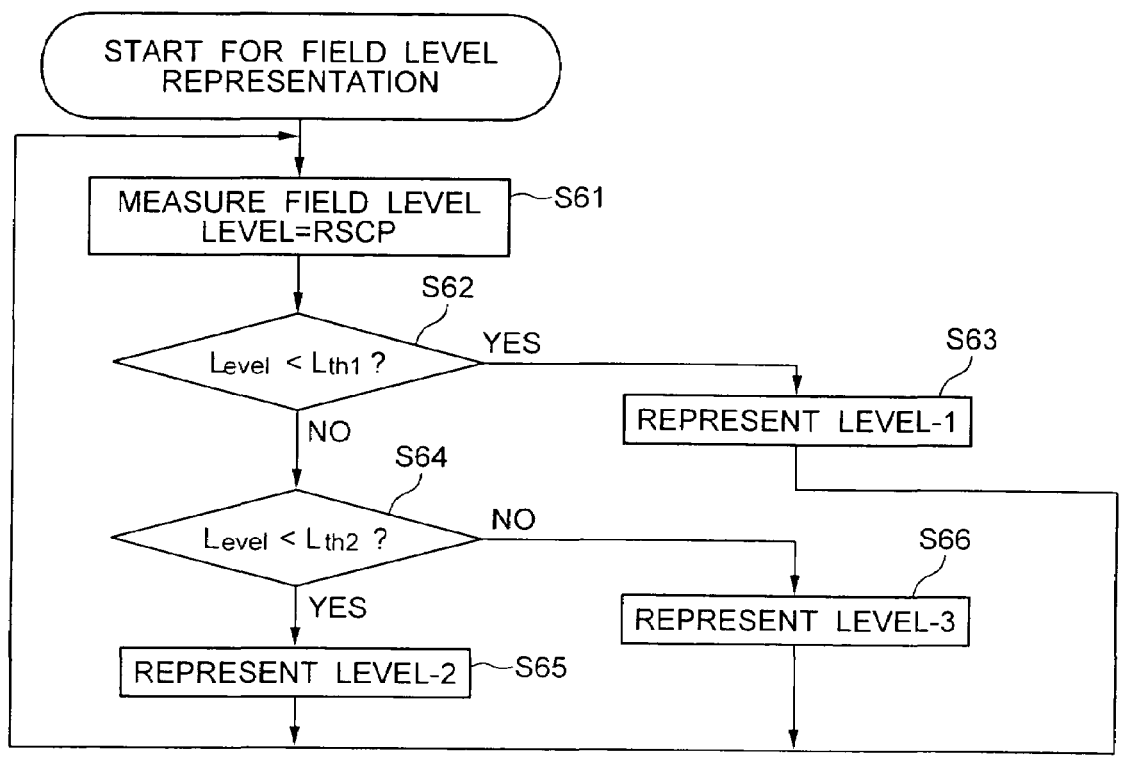
FIG. 11 is a flowchart for representation processing of the electric field level by a conventional mobile terminal.

FIG. 9 shows a flowchart of detection processing of a degraded communication quality in a mobile station according to a fifth example of the present invention.

The degradation detection processing starts at step S41 wherein it is judged whether or not the mobile station is in the state of communication. If the mobile station is out of the state of communication, then the process advances to step S46 wherein the CPU 24 sets the flag Q_ALM=OFF to execute an alarm stop processing of the degraded communication quality.

If it is judged in step S41 that the mobile station is in the state of communication, the CPU 24 allows the CRC test block 26 to count the numbers of NGs and stores the accumulated numbers as a variable CRC (step S42). It is judged in step S43 whether or not CRC>CRC$_{th}$. If the judgement in step S43 is negative, the process advances to step S46 to set the flag Q_ALM=OFF. If the judgement in step S43 is affirmative, then it is further judged in step S44 whether or not the electric field level is equal to or exceeds the second threshold, i.e., L$_{evel}$≧L$_{th2}$. If the judgement in step S44 is affirmative, then the process advances to step S45 wherein the CPU sets the flag Q_ALM=OFF. If the judgement in step S44 is negative, the process advances to step S46 wherein the CPU 24 sets the flag Q_ALM=ON.

In the above examples, there are two kinds of procedures in order for stopping the existing alarm: (a) if the field level measurement block measures a higher field level compared to the field level detected upon generation of the alarm, the existing alarm is stopped; and (b) if the quality degradation detecting block detects a non-degraded communication level, the existing alarm is stopped.

Since the above embodiments are described only for examples, the present invention is not limited to the above embodiments and various modifications or alterations can be easily made therefrom by those skilled in the art without departing from the scope of the present invention.

What is claimed is:

1. A mobile station comprising:
   a degradation detecting section for detecting a degraded communication quality of the mobile station;
   an electric field measurement section for measuring an intensity of an electric field of the mobile station;
   a display section for representing an electric field level selected from among a plurality of electric field levels;
   a control section for, in response to detection of no degraded communication quality by said degradation detecting section, allowing said display section to represent said electric field level corresponding to said measured intensity of said electric field, and in response to detection of degraded communication quality by said degradation detecting section, allowing said display section to represent said electric field level corresponding to a fixed electric field level regardless of said detected intensity of said electric field; and
   a movement detector for detecting a movement of said mobile station,
   wherein said degradation detecting section and said electric field level measurement section are adapted for periodically detecting a degradation of a communication quality and measuring said intensity of said electric field, respectively, at respective time intervals, said degradation detecting section being adapted for detecting degraded communication quality at a longer time interval upon detection of a stationary state of said mobile station by said movement detector.

2. The mobile station according to claim 1, wherein said electric field measurement section is adapted for measuring, as said intensity of said electric field, an RSSI (received signal strength indicator) or RSCP (received signal code power) based on data received from a base station.

3. The mobile station according to claim 2, wherein said data received from said base station is adapted to be transmitted through a paging channel.

4. The mobile station according to claim 1, wherein said degradation detecting section is adapted for counting a number of errors in a CRC (cyclic redundancy check) test, and comparing said number of errors against a threshold to judge said degraded communication quality.

5. The mobile station according to claim 1, wherein said fixed electric level corresponds to a minimum electric field level among said plurality of electric field levels.

6. The mobile station according to claim 1, wherein said control section is adapted for generating an alarm upon detection of degraded communication quality by said degradation detecting section.

7. The mobile station according to claim 6, wherein said control section is adapted for stopping said alarm after said degradation detecting section no longer detects degraded communication quality.

8. The mobile station according to claim 6, wherein said control section is adapted for stopping said alarm after said electric field measurement section detects an intensity of said electric field corresponding to a higher electric field level compared to an electric field level upon generation of said alarm.

9. A method for representing a level of an electric field of a mobile station, comprising the steps of:
   detecting a degraded communication quality of the mobile station;
   measuring an intensity of an electric field of the mobile station;
   representing a field level among a plurality of field levels, said field level corresponding to said measured intensity of said electric field when no degraded communication quality is detected, and said field level being a fixed electric field level regardless of said measured intensity of said electric field when degraded communication quality is detected; and
   detecting a movement of said mobile station,
   wherein said degradation detecting step and said electric field measuring step periodically detects a degradation of a communication quality and measures said intensity of said electric field, respectively, at respective time intervals, said time interval of said degradation detecting step being set to a longer time interval upon detection of a stationary state of said mobile station by said movement detecting step.

10. The method according to claim 9, wherein said electric field measuring step measures, as said intensity of said electric field, an RSSI (received signal strength indicator) or RSCP (received signal code power) based on data received from a base station.

11. The method according to claim 10, wherein said data received from said base station is transmitted through a paging channel.

12. The method according to claim 9, wherein said degradation detecting step counts a number of errors in a CRC (cyclic redundancy check) test, and compares said number of errors against a threshold to judge said degraded communication quality.

13. The method according to claim 9, wherein said fixed electric field level corresponds to a minimum electric field level among said plurality of electric field levels.

14. The method according to claim 9, further comprising the sten of generating an alarm when degraded communication quality is detected.

15. The method according to claim 14, further comprising the step of stopping said alarm after no degraded communication quality is detected.

16. The method according to claim 14, further comprising the step of stopping said alarm after said electric field measuring step measures an intensity of said electric field corresponding to a higher electric field level compared to an electric field level upon generation of said alarm.

17. A program stored in a recording medium for running on a computer of a mobile station to define the steps of:
  detecting a degraded communication quality of the mobile station;
  measuring an intensity of an electric field of the mobile station;
  representing a field level among a plurality of field levels, said field level corresponding to said measured intensity of said electric field when no degraded communication quality is detected, and said field level being a fixed electric field level regardless of said measured intensity of said electric field when degraded communication quality is detected; and
  detecting a movement of said mobile station,
  wherein said degradation detecting sten and said electric field measuring step periodically detects a degradation of a communication quality and measures said intensity of said electric field, respectively, at respective time intervals, said time interval of said degradation detecting step being set to a longer time interval upon detection of a stationary state of said mobile station by said movement detecting step.

* * * * *